United States Patent
Sysoev et al.

(10) Patent No.: US 11,134,137 B1
(45) Date of Patent: Sep. 28, 2021

(54) FILTER-BASED REQUEST PROCESSING IN A WEB SERVER

(71) Applicant: NGINX, Inc., San Francisco, CA (US)

(72) Inventors: Igor Sysoev, Moscow (RU); Valentin Bartenev, Moscow (RU); Nikolay Shadrin, San Francisco, CA (US); Maxim Romanov, Moscow (RU)

(73) Assignee: F5 NETWORKS, INC., Seattle, WA (US)

( * ) Notice: Subject to any disclaimer, the term of this patent is extended or adjusted under 35 U.S.C. 154(b) by 57 days.

(21) Appl. No.: 16/372,068

(22) Filed: Apr. 1, 2019

Related U.S. Application Data

(60) Provisional application No. 62/662,157, filed on Apr. 24, 2018.

(51) Int. Cl.
   *H04L 29/08* (2006.01)
   *G06F 13/16* (2006.01)
   *G06F 9/30* (2018.01)

(52) U.S. Cl.
   CPC ........ *H04L 67/322* (2013.01); *G06F 9/30123* (2013.01); *G06F 13/1657* (2013.01); *H04L 67/1029* (2013.01); *H04L 67/327* (2013.01)

(58) Field of Classification Search
   CPC . H04L 67/322; H04L 67/327; H04L 67/1029; G06F 13/1657; G06F 9/30123
   See application file for complete search history.

(56) References Cited

U.S. PATENT DOCUMENTS

| | | | |
|---|---|---|---|
| 2011/0307677 A1* | 12/2011 | David | G06F 9/5016 711/163 |
| 2020/0210223 A1* | 7/2020 | Saka | G06F 9/546 |

OTHER PUBLICATIONS

"Apache HTTP Server Version 2.4 Filters," The Apache Software Foundation, 2018, 4 pages, [Online] [Retrieved on Mar. 8, 2018] Retrieved from the Internet <URL:https://httpd.apache.org/docs/current/filter.html>.

\* cited by examiner

*Primary Examiner* — Austin J Moreau
(74) *Attorney, Agent, or Firm* — Troutman Pepper Hamilton Sanders LLP (Rochester)

(57) ABSTRACT

Filter-based request processing includes generating first data corresponding to a request. A first queue node is generated for processing the first data. The first queue node references a first buffer and a filter subroutine. The first buffer references the first data and a completion handler for performing completion tasks associated with the filter subroutine. The first queue node is executed. The executing includes processing the first data using the filter subroutine to generate a second buffer referencing second data. A second queue node is generated that includes the completion handler. The second queue node is executed. The executing includes processing the completion handler to perform the completion tasks. A response is transmitted corresponding to the request. The response includes the second data referenced by the second buffer.

19 Claims, 6 Drawing Sheets

FILTER-BASED REQUEST PROCESSING IN A WEB SERVER

CROSS-REFERENCE TO RELATED APPLICATIONS

This application claims the benefit of U.S. Patent Application No. 62/662,157, filed Apr. 24, 2018, which is incorporated by reference herein.

BACKGROUND

1. Field of the Invention

This invention pertains in general to web server architectures and in particular to filter-based request processing in a web server.

2. Description of the Related Art

In a traditional web server architecture, different processes accept, supervise, and process web requests and responses. The requests and responses are associated with data, such as contents of web pages, files, images, etc., that need to be processed. The data may be processed by a chain of filter subroutines, wherein each filter subroutine performs a particular function on the data.

In traditional web server architectures, the filter subroutines recursively call other filter subroutines, thus creating a complex call recursion tree. In a traditional web server architecture using filter subroutines, tracking a state of the data processing can therefore result in overly complex programming logic. This increases engineering time, results in a larger number of logical errors, and increases the difficulty of code maintenance. Moreover, various external errors and exceptions may occur during filter processing. Such errors and exceptions are difficult to track and repair in the complex call recursion tree.

SUMMARY

The above and other needs are met by methods, computer-readable storage media, and systems for filter-based request processing.

One aspect provides a computer-implemented method for filter-based request processing including generating first data corresponding to a request. A first queue node is generated for processing the first data. The first queue node references a first buffer and a filter subroutine. The first buffer references the first data and a completion handler for performing completion tasks associated with the filter subroutine. The first queue node is executed. The executing includes processing the first data using the filter subroutine to generate a second buffer referencing second data. A second queue node is generated that includes the completion handler. The second queue node is executed. The executing includes processing the completion handler to perform the completion tasks. A response is transmitted corresponding to the request. The response includes the second data referenced by the second buffer.

Another aspect provides a non-transitory computer-readable storage medium storing executable computer program instructions for filter-based request processing. The computer program instructions generate first data corresponding to a request. A first queue node is generated for processing the first data. The first queue node references a first buffer and a filter subroutine. The first buffer references the first data and a completion handler for performing completion tasks associated with the filter subroutine. The first queue node is executed. The executing includes processing the first data using the filter subroutine to generate a second buffer referencing second data. A second queue node is generated that includes the completion handler. The second queue node is executed. The executing includes processing the completion handler to perform the completion tasks. A response is transmitted corresponding to the request. The response includes the second data referenced by the second buffer.

Still another aspect provides a system for filter-based request processing. The system includes a computer processor and a non-transitory computer-readable storage medium storing executable computer program instructions that when executed by the computer processor perform actions including generating first data corresponding to a request. A first queue node is generated for processing the first data. The first queue node references a first buffer and a filter subroutine. The first buffer references the first data and a completion handler for performing completion tasks associated with the filter subroutine. The first queue node is executed. The executing includes processing the first data using the filter subroutine to generate a second buffer referencing second data. A second queue node is generated that includes the completion handler. The second queue node is executed. The executing includes processing the completion handler to perform the completion tasks. A response is transmitted corresponding to the request. The response includes the second data referenced by the second buffer.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a computing environment supporting filter-based request processing, according to one embodiment.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Computing Environment Supporting Filter-Based Request Processing

Figure 1:
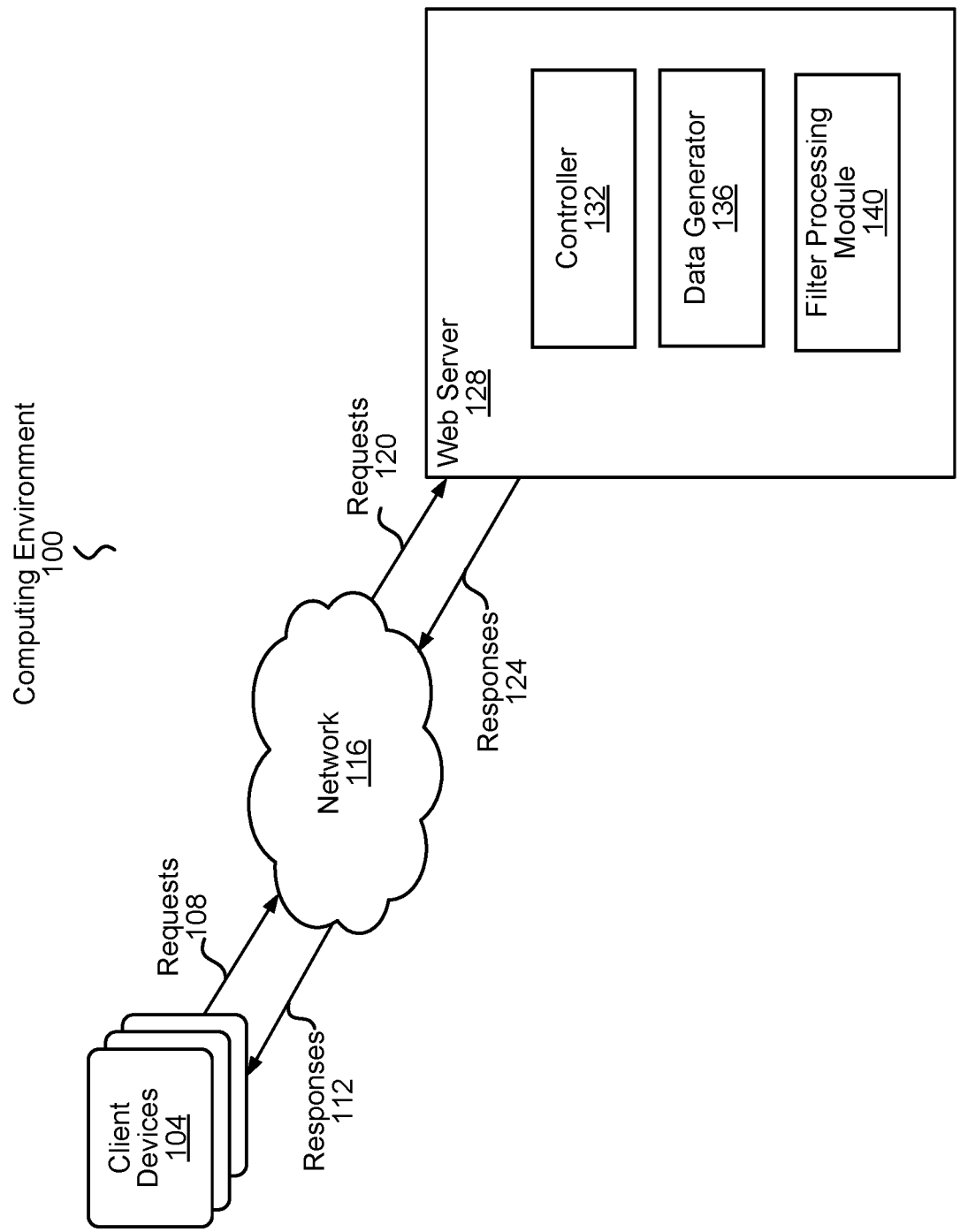

Figure (FIG. 1 is a high-level block diagram of a computing environment 100 supporting filter-based request processing, according to one embodiment. FIG. 1 illustrates multiple client devices 104 and a web server 128 connected by a network 116. While only a few client devices 104 and one web server are shown in FIG. 1, embodiments of the computing environment 100 can have many such entities connected to the network.

FIG. 1 uses like reference numerals to identify like elements. A letter after a reference numeral, such as "140a," indicates that the text refers specifically to the element having that particular reference numeral. A reference numeral in the text without a following letter, such as "140," refers to any or all of the elements in the figures bearing that reference numeral. For example, "140" in the text refers to reference numerals "140a" and/or "140b" in the figures.

A client device 104 is an electronic device used by a user to perform functions such as consuming digital content, executing software applications, browsing web sites hosted by or otherwise interacting with the web server 128 on the network 116, and downloading files. For example, the client device 104 may be a smartphone or a tablet, notebook, or desktop computer. In addition, the client device 104 may be an Internet-of-Things (IoT)-connected device such as a home appliance, or even another web server. The client device 104 may include a display device on which the user may view digital content stored on the client device 104 or downloaded from the web server 128. In addition, the client device 104 may include a user interface (UI), such as physical and/or on-screen buttons, with which the user may interact to perform functions such as consuming digital content, obtaining digital content, and transmitting digital content.

A client device 104 sends requests 108 to the web server 128 via the network 116. A request 108 may seek to execute a software application on data maintained, controlled, or otherwise accessible by the web server 128. In one embodiment, the client device 104 sends the request 108 using a protocol. A protocol refers to a system of organizing and managing data transmission processes on the web (e.g., between computers, routers, etc.,), portioning data into message packets, addressing of data message packets, etc. For example, the client device 104 may send the request 108 using a protocol, such as the Hypertext Transfer Protocol (HTTP) or a secure variant thereof. For example, a web browser on the client device 104 may send a request 108 to the web server 128 to post or fetch a file (e.g., a web page or an image). The request 108 includes information identifying the requested resource and may also include information identifying the software application, content to be posted, the client device 104, the server 128, and the session.

The network 116 enables communications among the client devices 104 and the web server 128. To this end, the network 116 receives requests 108 and corresponding data (e.g., data for a software application) from client devices 104 and forwards the requests 120 to the web server 128. Likewise, the network 116 receives responses 124 and corresponding data (e.g., data to be downloaded from a software application or web page) from the web server 128 and forwards the responses 112 to the client devices 104.

The network 116 can comprise the Internet as well as mobile telephone networks. In one embodiment, the network 116 uses standard communications technologies and/or protocols. Thus, the network 116 can include links using technologies such as Ethernet, 802.11, Long-Term Evolution (LTE), etc. The networking protocols used on the network 116 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The web server 128 receives and processes requests 120 from the client devices 104 and sends responses 124 back to the requesting client devices 104. As mentioned above, the requests 120 received by the web server 128 are typically associated with data. For a given request 120, the web server 128 may also obtain a requested data resource, execute a software application on data from the data resource, and send response data 124 back to the requesting client device 104. The data resource is typically a file or other data, such as a web page or component thereof.

The web server 128 illustrated in FIG. 1 includes a controller 132, a data generator 136, and a filter processing module 140. Requests 120 received by the web server 128 are processed by controller 132. In one embodiment, the controller 132 is a process that analyzes the requests 120 and routes the requests 120 to one or more worker processes for further processing. There may be multiple controllers 132 operating concurrently in order to support load balancing and other features. Upon processing the requests, the workers send responses and data back to the controller 132.

The data generator 136 is a subroutine that generates input data associated with a request 120 for processing by filter subroutines in the web server 128. Each filter subroutine (described in more detail below with respect to FIG. 2) performs a particular function on data in one or more buffers of the web server 128 to generate output data. A buffer references a memory segment or a file segment of the web server 128. For example, a filter subroutine may perform SSL encryption on data in a memory segment referenced by a buffer, compress the data, perform HTML processing on the data, etc. The data generator 136 may transmit user data from a client device 104 associated with a request 120 received by the controller 132 to a filter subroutine for executing a function on the data. Alternately, the data generator may obtain data for the request 102 from an external resource (e.g., a web page on the server 128 or on another server) referenced by the request 120 or the data generator may itself create the data on-the-fly according to instructions in the request 120 or by executing a software application referenced by the request 120.

The filter processing module 140 (described in greater detail below with reference to FIGS. 2 and 3) receives the data from the data generator 136, executes the filter subroutines on the data, and creates output data. The output data may be consumed by another application on the web server 128 or transmitted with a response 124 to a client device 104. The filter subroutines may be configured into a chain to provide sequential data processing on the data from the data generator 136. The filter processing module 140 generates an execution queue referencing the filter subroutines to process the data. Each queue node on the execution queue references a filter subroutine and a buffer referencing a set of data input to the filter subroutine. The set of data may be stored in a segment of memory referenced by the buffer. Each buffer also references a completion handler, which is a subroutine that performs completion tasks associated with the filter subroutines after the filter subroutines execute on the set of data. Once a filter subroutine executes on the set of data, the filter processing module 140 adds the completion handler for the buffer to the execution queue and executes the completion handler to perform the completion tasks associated with the filter subroutine. After the completion handler has performed the completion tasks, the filter processing module 140 may add the next queue node to the execution queue for executing the next filter subroutine in the chain.

The benefits and advantages of the disclosed embodiments are as follows. The use of the filtering subroutines on the buffers decreases the number of memory copy operations (e.g., between memory segments) and provides the ability to split a large computational task into a number of smaller tasks and process only a portion of a large data set, etc. This results in more efficient computation and more efficient use of server resources. The use of completion handlers in the execution queue avoids generating recursive calls to filter subroutines, thus flattening the filter subroutine execution to process data in a highly flexible and configurable manner. When a filter subroutine completes execution, the completion handler can delete buffers used by the filter subroutine to free up memory referenced by the buffers. The completion handler may also add the buffers to a list of available buffers for storing new data. A filter subroutine that is paused due to reaching a maximum limit on allocated memory may be restarted by the completion handler when the freed up memory or these buffers are made available. Therefore this technique provides an efficient way to track the state of the data processing, leading to simpler programming logic.

Server Architecture Supporting Filter-Based Request Processing

Figure 2A:
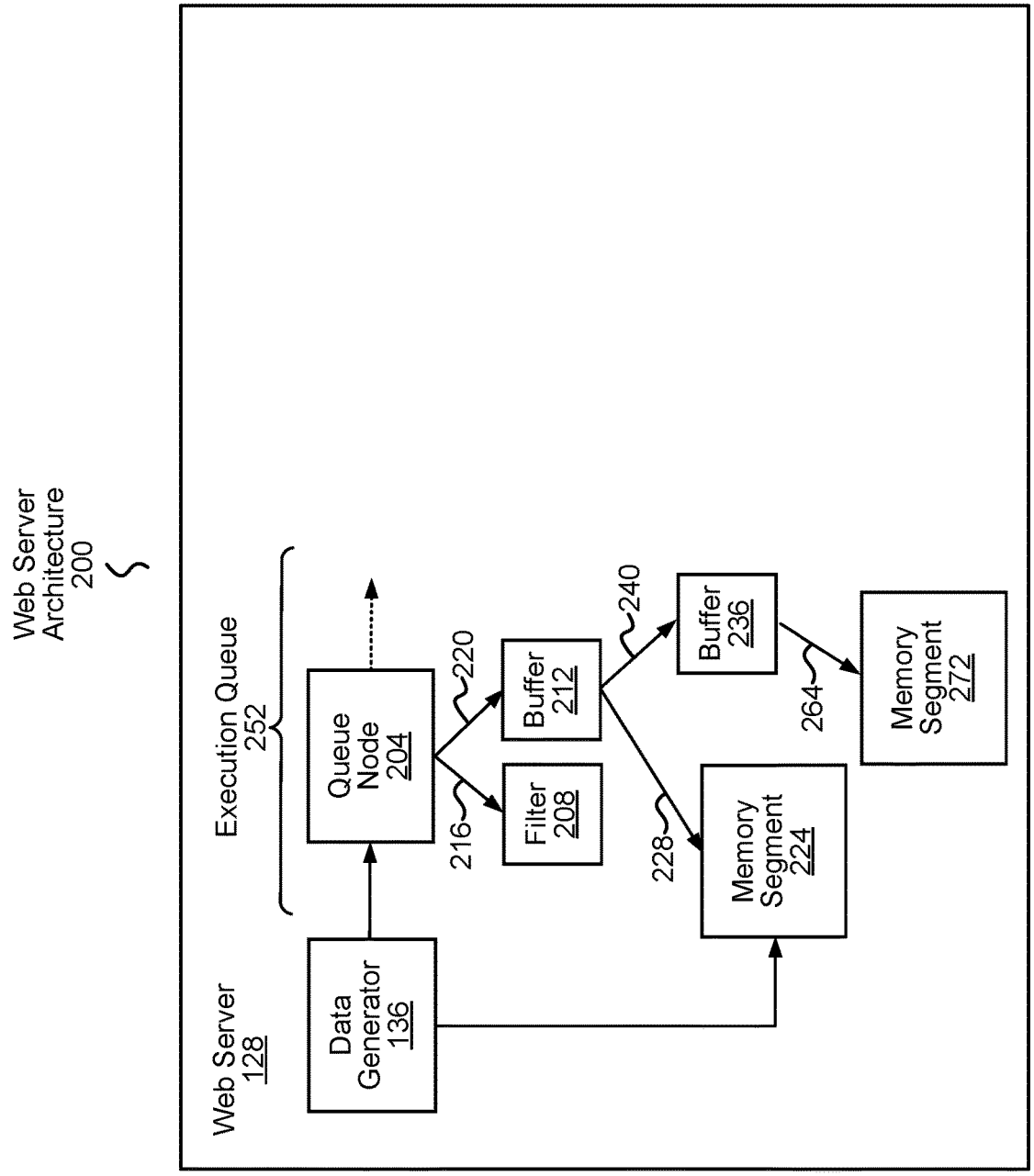
FIG. 2A is a high-level block diagram illustrating a more detailed view of the architecture of the web server of FIG. 1, according to one embodiment.

FIG. 2A is a high-level block diagram illustrating a more detailed view of the architecture 200 of the web server 128 of FIG. 1, according to one embodiment. FIG. 2A illustrates the data generator 136 of FIG. 1. In addition, FIG. 2A illustrates a queues node 204 generated by the filter processing module 140 of FIG. 1 within an execution queue 252. Likewise, FIG. 2A illustrates a memory segment 224 to store data generated by the data generator 136. The queue node 204 references a filter subroutine 208 and a buffer 212. The buffer 212 references the data in the memory segment 224 as well as an output buffer 236 for storing output data. The buffer 236 references a memory segment 272, which is used to store the data output from the filter subroutine 208. Other embodiments of the web server 128 can have different and/or other modules than the ones described here, and the functionalities can be distributed among the modules in a different manner.

As discussed earlier, the controller 132 supervises processing of requests 120 from the client devices 104. When an inbound request 120 with its corresponding data reaches the web server 128, it is passed to the controller 132. The controller 132 analyzes the request 120 and may route the request to the filter processing module 140; data from the request is routed to the data generator 136. As discussed earlier, the data generator 136 generates input data associated with the request 120 for processing by filter subroutines (e.g., filter 208) in the web server 128. For example, the data generator 136 may transmit user data from a client device 104 associated with the request 120 received by the controller 132 to the memory segment 224 for the filter subroutine 208 to process. Alternately, the data generator 136 may obtain the data from a web page on the server 128 or on another server, or the data generator 136 may itself create the data on-the-fly according to instructions in the request 120 or by executing a software application referenced by the request 120. The data generator 136 stores the input data for the execution queue 252 in the memory segment 224.

The filter processing module 140 generates the execution queue 252 including the queue node 204, which is next in the execution queue 252 after the data generator 136. The execution queue 252 includes process nodes (e.g., 204) in a defined sequence and enables flattening of the filter subroutine calls, efficient task scheduling, and the ability to delay and restart process filter execution either in a priority order of priority, on a first-in first-out basis, or in any order that serves the purpose of the application software being executed.

The queue node 204 is an execution sequence unit of the execution queue 252. The queue node 204 is referenced by the data generator 136, and the queue node 204 itself may reference the next queue node to be executed in the execution queue 252 after the queue node 204 has been executed. Each queue node may be a configurable process that is able to reference a filter subroutine and buffers. For example, the queue node 204 references the filter subroutine 208 using the reference 216. The queue node 204 also references the buffer 212 using the reference 220.

Each filter subroutine (e.g., 208) performs a particular function on input data to generate output data. For example, a filter subroutine may perform SSL encryption on data, compress the data (e.g., Gzip), perform HTML processing on the data, etc. A filter subroutine may be used to process data originating from the client device 104 as well as process outgoing data originating on the web server 128 in a response 124. For example, the web server 128 may accept a request 120 for data from a client device 104 and the content requested from the web server 128 may pass through an output filter subroutine on its way back to the client device 104. Examples of web software supporting the use of filter subroutine chains may be found in Apache 2.0 and other third-party modules (e.g., HTML and XML processing and rewriting, XSLT transforms and XIncludes, XML namespace support, file upload handling and decoding of HTML forms, image processing, text search-and-replace editing, etc.)

Each filter subroutine (e.g., 208) is a software module that may be called by a queue node (e.g., 204). The filter subroutine 208 is thereby configured by the execution queue 252 to process data according to the request 120 in the sequence established by the execution queue 252. The data may be used by the associated filter subroutine 208 for processing when the queue node 204 is executed. In another example, the filter subroutine 208 may itself be on the end of the execution queue 252 for processing output data received from a sequence of other filter subroutines. The queue node 204 also references the buffer 212 using the reference 220. The buffer references input data for the filter subroutine 208 to process.

Each buffer (e.g., 212) may directly reference a memory segment (e.g., 224) or a file segment. A buffer may also indirectly reference a memory segment or a file segment by pointing to another buffer that references the memory segment or the file segment. When a child buffer indirectly references a memory segment or a file segment by pointing to a parent buffer that references the memory segment or the file segment, the parent buffer's retention counter is incremented by the filter subroutine creating the child buffer. For example, the buffer 212 references the input data generated by the data generator 136 in the memory segment 224 using a reference 228. The buffer 212 may point to a start location of the data in the memory segment 224, an end location of the data in the memory segment 224, a current read position in the memory segment 224, and a free marker identifying the start of free memory in the memory segment 224. The buffer 212 includes a reference 240 to the next buffer 236 in sequence (for storing output data from filter subroutine 208). In an embodiment, the filter subroutine 208 may consume data from two or more input (parent) buffers and write output data to an output buffer (e.g., 236). In embodiments therefore, the buffer 212 may also include a reference to the filter subroutine 208, a reference to a parent buffer (if one exists), and a counter indicating a number of output buffers (e.g., 236) pointing to buffer 212 as a parent. As described above, the buffer 236 references a memory segment 272, which is used to store the data output from the filter subroutine 208.

The web server 128 may set a maximum limit on the number of buffers that may be allocated per incoming request 120 such that any single request may not fill up memory on the web server 128 to the detriment of other concurrent requests. In embodiments, the web server 128 may similarly set a maximum limit on the memory size available for use by all the buffers or a maximum limit on the memory size that may be allocated to a single buffer (e.g., 212). If a filter subroutine 208 is writing data to an output buffer 236 and the data exceeds the maximum limit on the memory size that may be allocated to buffer 236, the filter subroutine may be paused by the filter processing module 140 until a new output buffer is available.

Figure 2B:
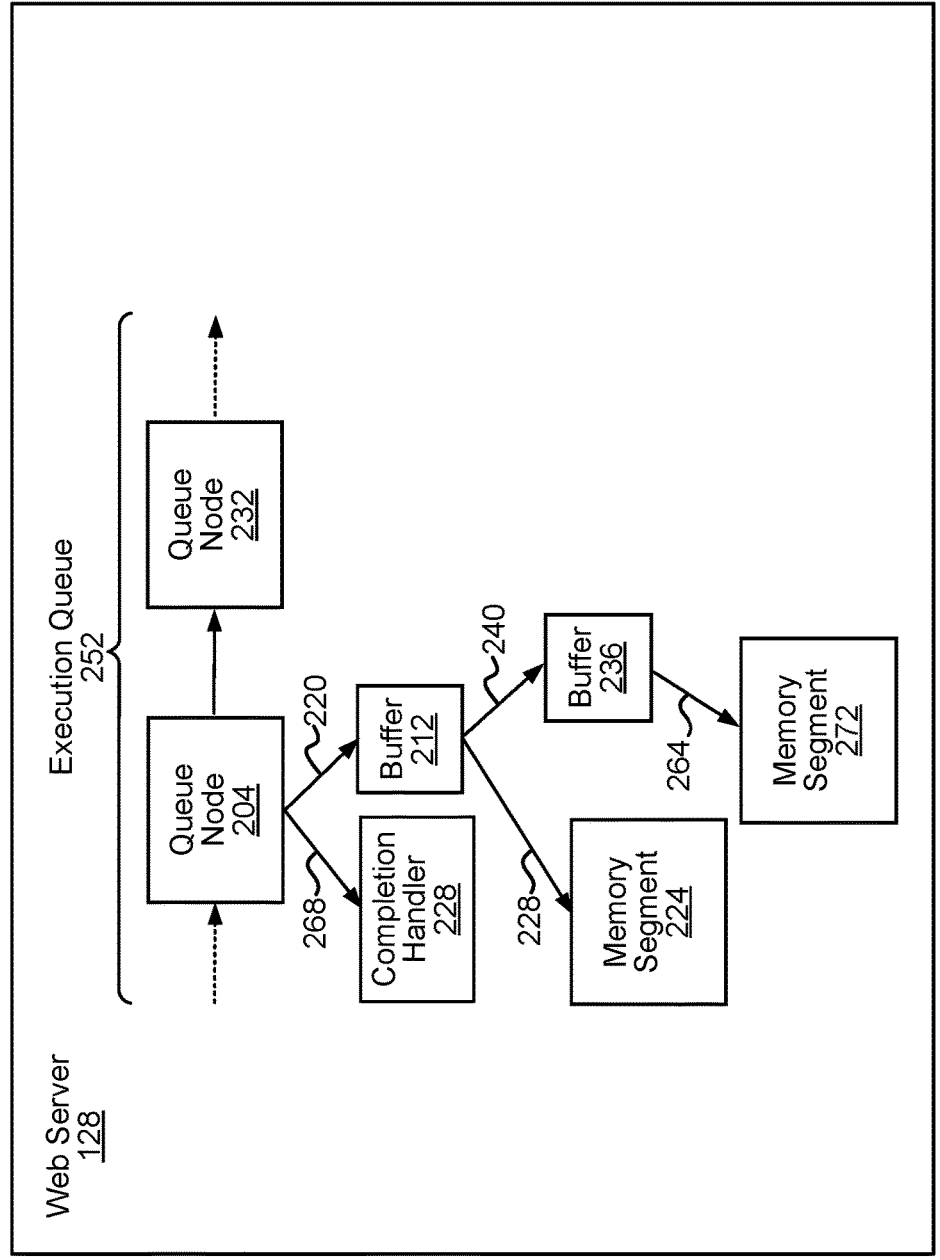
FIG. 2B is a high-level block diagram illustrating a completion handler in the architecture of FIG. 2A, according to one embodiment.

Server Architecture Including a Completion Handler for Filter-Based Request Processing FIG. 2B is a high-level block diagram illustrating a completion handler 228 in the architecture of FIG. 2, according to one embodiment. FIG. 2B illustrates the completion handler 228 for buffer 212, which is placed next in the execution queue 252 after the filter subroutine 208 executes. FIG. 2B also illustrates a queue node 232, which is the next queue node in the execution queue 252 created by the filter processing module 140. Other embodiments of the web server 128 can have different and/or other modules than the ones described here, and the functionalities can be distributed among the modules in a different manner.

The buffer 212 references the completion handler 228, which may also be referenced by the queue node 204 using reference 268. A completion handler (e.g., 228) is a subroutine that executes after a parent function has executed. For example, a completion handler may be referenced by a data download function and invoked to perform an operation once the parent download function has downloaded a file from a network. Once the filter subroutine 208 completes execution on the buffer 212, the filter processing module 140 adds the completion handler to queue node 204. The completion handler 228 is therefore next in the execution queue 252 after the filter subroutine 208. Once filter subroutine 208 has executed, the completion handler 228 executes.

The completion handler 228 executes on the buffer 212 after the filter subroutine 212 executes on the buffer 208. For example, the completion handler 228 executes once the data referenced by buffer 212 has been processed using the filter subroutine 208 to generate buffer 236 referencing output data from filter subroutine 208. The completion handler 228 performs completion tasks associated with the filter subroutine 208. Once the filter subroutine 208 completes, it may generate a completion code that indicates the results of the processing of the data.

The completion handler 228 performs completion tasks associated with the filter subroutine 208 by retrieving the value of the completion code. For example, a completion code may indicate that the filter subroutine 208 executed successfully. Responsive to the completion code indicating that the filter subroutine 208 executed successfully, the completion handler 228 may delete the buffer 212 and all its included references to free up memory (in the memory segment 224) referenced by the first buffer. This freed up memory may then be made available by the filter processing module 140 for storing new input or output data to other filter subroutines that may have exceeded a maximum limit on the memory size available for buffers or a maximum limit on the memory size that may be allocated to a single buffer.

Alternatively, responsive to the completion code indicating that the filter subroutine 208 executed successfully, the completion handler 228 may add the buffer 212 to a list of available buffers for storing data. This freed up buffer may then be made available by the filter processing module 140 to other filter subroutines that may have exceeded a maximum limit on the number of buffers that may be allocated for the associated request 120. Responsive to the completion code indicating that the filter subroutine 208 executed successfully, the controller 132 may transmit a response 124 corresponding to the request 120 to the client device 104. The response 124 includes the output data referenced by the buffer 236.

If a completion code indicates that the filter subroutine 208 did not complete successfully because it exceeded memory referenced by the output buffer 236, the filter subroutine 208 may have paused because there was no more memory space to write to. The completion handler 228 searches the list of available buffers to determine whether a new buffer is available for storing the data output by the filter subroutine 208. For example, a new buffer may be available to store data if the new buffer was freed up and added to the list of available buffers by a completion handler of the new buffer after another filter subroutine reading from the new buffer executed successfully. If the new buffer is available, the queue node 204 is reconfigured to reference the new buffer for storing output data from the filter subroutine 208. The new buffer is reconfigured to reference the data output from the filter subroutine 208.

Other references may also be added to the new buffer. For example, a reference may be added to point to a start location of the output data in a memory segment being written to, an end location of the output data, a current write position in the memory segment, or the start of free memory in the memory segment. A reference may be added to the next buffer in sequence, to the filter subroutine 208, to a parent buffer (if one exists), and a counter indicating a number of output buffers pointing to the new buffer as a parent. The completion handler 228 then restarts the filter subroutine 208 to write new output data to the new buffer.

Similarly, if a completion code indicates that the filter subroutine 208 did not complete successfully because the filter subroutine 208 exceeded a maximum limit on a number of buffers corresponding to each request set by the web server 128, the completion handler 228 may determine whether a new buffer is available for storing the data output by the filter subroutine 208. If a new buffer is available, the queue node 204 is reconfigured to reference the new buffer for storing output data from the filter subroutine 208. The new buffer is reconfigured to reference the output data from the filter subroutine 208. The completion handler 228 then restarts the filter subroutine 208 to write new output data to the new buffer.

Once the completion handler 228 has executed the completion tasks associated with the filter subroutine 208, the filter processing module 140 generates the next queue node 232 in the execution queue 252. The queue node 232 is referenced by queue node 204, and the queue node 232 itself may reference the next queue node to be executed in the execution queue 252 after the queue node 232 has been executed. This is because the filter chain configured by the filter processing module 140 has configured filter subroutine 208 to feed into a filter subroutine referenced by queue node 232.

In an embodiment, once the filter subroutine 208 that is prior in the filter chain to the filter subroutine of queue node 232 executes, the completion handler 228 or the filter processing module 140 may determine that the filter subroutine of queue node 232 is paused because it exceeded the memory referenced by its output buffer and there was no more memory space to write to. The completion handler 228 may determine that there is now a new buffer available (e.g., buffer 212) for storing the data output by the filter subroutine of queue node 232. The queue node 232 is reconfigured to reference the buffer 212 for storing output data from its filter subroutine. The buffer 212 is reconfigured to reference the data output from the filter subroutine of queue node 232. The filter subroutine of queue node 232 may then be restarted to write new output data to the buffer 212.

Filter Processing Module

Figure 3:
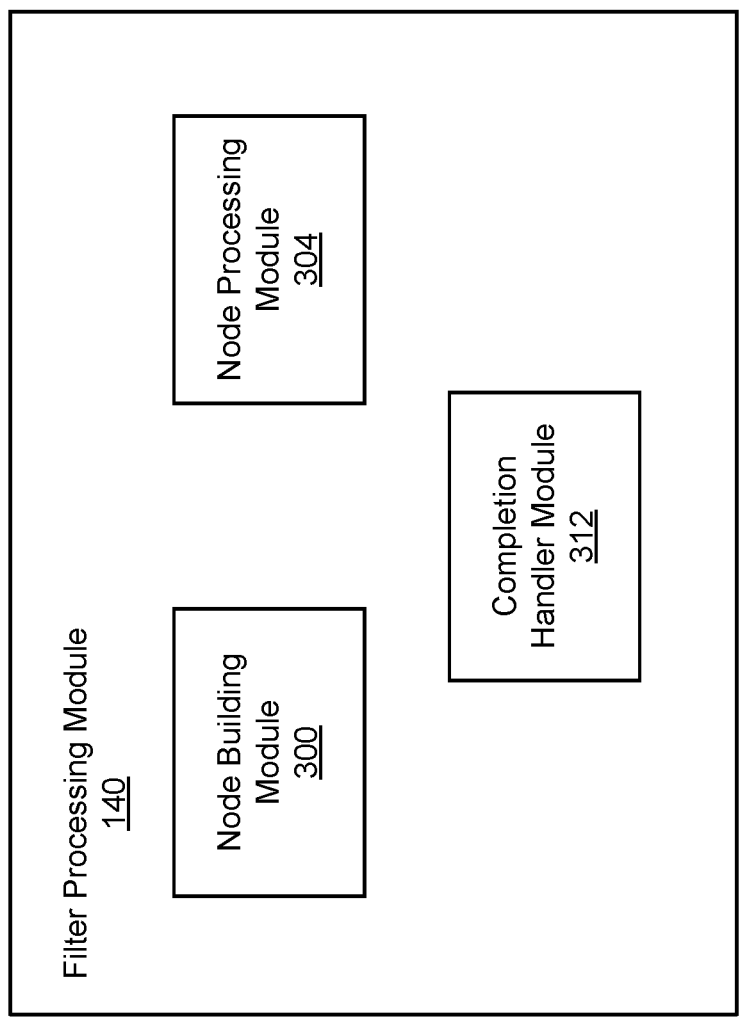
FIG. 3 is a high-level block diagram illustrating components of a filter processing module according to one embodiment.

FIG. 3 is a high-level block diagram illustrating components of a filter processing module 140 according to one embodiment. FIG. 3 illustrates that the filter processing module 140 includes a node building module 300, a node processing module 304, and a completion handler module 312. Other embodiments of the filter processing module 140 can have different and/or other modules than the ones described here, and the functionalities can be distributed among the modules in a different manner.

The node building module 300 generates the queue nodes (e.g., 204) in the execution queue 252 following the data generator 136. The node building module 300 generates each queue node (e.g., 204) as an execution sequence unit of the execution queue 252. The node building module 300 adds a reference to the queue node 204 from the data generator 136, such that the queue node 204 may be executed to process the data from the data generator 136. The node building module 300 also adds a reference from the queue node 204 to the next queue node to be executed in the execution queue 252 after the queue node 204 has been executed. The node building module 300 generates each queue node to be a configurable process that is able to reference a filter subroutine and buffers. For example, the node building module 300 adds a reference 216 from queue node 204 to the filter subroutine 208. The filter subroutine 208 is thereby configured by the node building module 300 to process data according to the request 120 in the sequence established by the execution queue 252. When generating the execution queue 252, the node building module 300 may adhere to a maximum limit on the number of buffers that may be allocated per incoming request 120, a maximum limit on the memory size available for use all the buffers, or a maximum limit on the memory size that may be allocated to a single buffer.

The node building module 300 adds the reference 220 from queue node 204 to the buffer 212. During the generating of the queue node 204, the node building module 300 adds a set of references from the buffer 212 that point to data in the memory segment 224. The node building module 300 adds reference 228 from the buffer 212 to the memory segment 224. The node building module 300 may also add references from the buffer 212 pointing to a start location of the data in the memory segment 224, an end location of the data, a current read position in the memory segment 224, and the start of free memory in the memory segment 224. The node building module 300 may also add a reference 240 from the buffer 212 pointing to the next buffer 236 in sequence. In an embodiment, the node building module 300 may also add a reference from the buffer 212 pointing to the filter subroutine 208, to a parent buffer (if one exists), and a counter indicating a number of output buffers (e.g., 236) pointing to buffer 212 as a parent.

The node building module 300 may also add a reference from the buffer 212 pointing to the completion handler 228. Once the filter subroutine 208 completes execution on the buffer 212, the node building module 300 generates a second queue node including the completion handler 228. The completion handler 228 is therefore next in the execution queue 252 after the queue node 204.

Once a queue node has been executed, the node building module 300 may generate the next queue node (e.g., 232) in the execution queue 252. The node building module 300 adds a reference to the queue node 232 from the prior completion handler 228. Similarly to the technique described above with respect to queue node 204, node building module 300 adds a reference 244 from the queue node 232 to the filter subroutine 248. The node building module 300 may also add a reference 256 from the queue node 232 to the buffer 236. The buffer 236 used to store the output data from filter 208 now stores the data input to the filter subroutine 248.

The node processing module 304 executes each queue node (e.g., 204) in the execution queue 252. The node processing module 304 executes each filter subroutine (e.g., 208) to process input data referenced by one or more buffers (e.g., 212) to generate output data. Once the filter subroutine 228 completes, it may generate a completion code that indicates the results of the processing of the data. If the node processing module 304 is executing the filter subroutine 208 to write data to an output buffer 236 and the output data exceeds the maximum limit on the memory size that may be allocated to buffer 236, the node processing module 304 may pause the filter subroutine 208 until a new output buffer is available. The completion code generated by the node processing module 304 will indicate whether the filter subroutine 208 executed successfully or exceeded available memory or available buffers.

The completion handler module 312 executes each completion handler (e.g., 228) for performing completion tasks associated with a filter subroutine (e.g., 208). The completion handler module 312 executes the completion handler 228 on its buffer 208 after the filter subroutine 212 executes on the buffer 208. For example, the completion handler module 312 executes the completion handler 228 once the data referenced by buffer 212 has been processed using the filter subroutine 208 to generate buffer 236 referencing output data from filter subroutine 208.

The completion handler module 312 executes the completion handler 228 to perform completion tasks by retrieving the value of the completion code. Responsive to a completion code indicating that a filter subroutine 208 executed successfully, the completion handler module 312 executes the completion handler 228 to delete the buffer 212 to free up memory referenced by the buffer 212. This freed up memory may then be made available to the node processing module 304 for restarting a paused filter subroutine. Responsive to the completion code indicating that the filter subroutine 208 executed successfully, the completion handler module 312 executes the completion handler 228 to add the buffer 212 to a list of available buffers for storing data. This freed up buffer may then be made available to the node processing module 304 for restarting a paused filter subroutine. Responsive to the completion code indicating that the filter subroutine 208 executed successfully, the completion handler module 312 may transmit a control message to the controller 132 referencing the output data of the buffer 236.

If a completion code indicates that the filter subroutine 208 completed unsuccessfully because it exceeded memory referenced by the output buffer 236, the filter subroutine 208 may have paused. The completion handler module 312 executes the completion handler to determine whether a new buffer is now available. Similarly, if a completion code indicates that the filter subroutine 208 completed unsuccessfully because the filter subroutine 208 exceeded a maximum number of buffers, the completion handler module 312 executes the completion handler 228 to determine whether a new buffer is available. If a new buffer is available, a control message may be transmitted to the node building module 300 to reconfigure the queue node 204 to reference the new buffer. A control message may be transmitted to the node processing module 304 to restart the filter subroutine 208.

In an embodiment, once the filter subroutine 208 that was prior in the filter chain to filter subroutine 248 executes, the completion handler module 312 may determine that the filter subroutine 248 is paused. The completion handler module 312 may execute the completion handler 228 to determine that there is now a new buffer available (e.g., buffer 212). The completion handler module 312 transmits a control message to the node building module 300 to reconfigure the queue node 232 to reference the buffer 212. The completion handler module 312 transmits a control message to the node processing module 304 to restart the filter subroutine 248 to write new output data to the buffer 212.

Process for Filter-Based Request Processing

Figure 4:
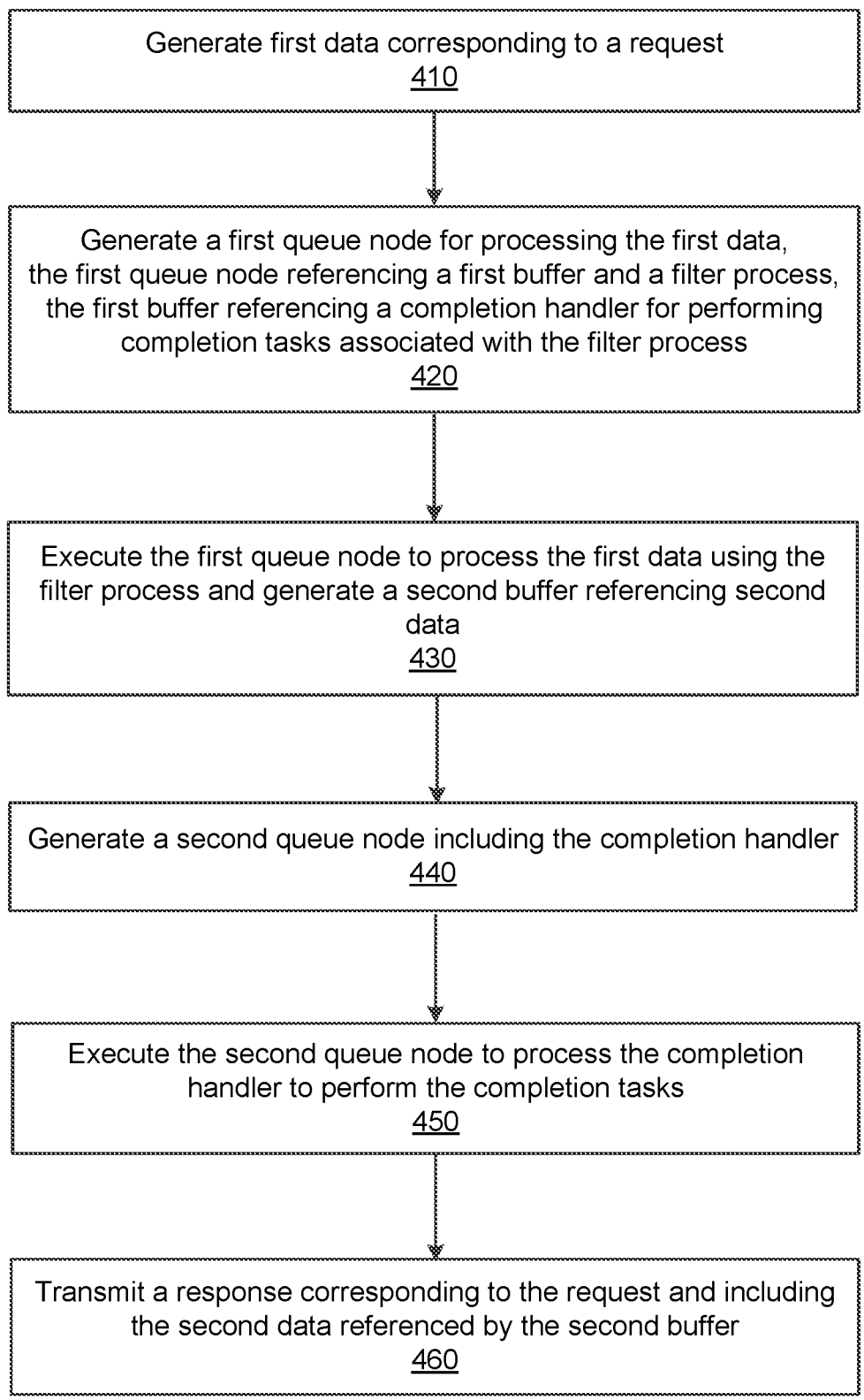
FIG. 4 is a flowchart illustrating steps performed for filter-based request processing, according to one embodiment.

FIG. 4 is a flowchart illustrating steps performed for filter-based request processing, according to one embodiment. The steps of FIG. 4 may be performed by the filter processing module 140. Some or all of the steps may be also performed by other entities. Likewise, the filter processing module 140 may perform the steps in different orders, and/or perform different or additional steps.

The data generator 136 generates 410 first data corresponding to a request 120 received by the controller 132. The data generator 136 may generate the first data from user data from a client device 104, or obtain the first data from a web page on the server 128 or on another server, or create the data on-the-fly according to instructions in the request 120 or by executing a software application referenced by the request 120.

The filter processing module 140 generates 420 a first queue node (e.g., 204) for processing the first data. The first queue node 204 references a first buffer (e.g., 212) and a filter subroutine (e.g., 208). The first buffer 212 references the first data and a completion handler (e.g., 228) for performing completion tasks associated with the filter subroutine 208.

The filter processing module 140 executes 430 the first queue node 204. The executing of the first queue node 204 includes processing the first data using the filter subroutine 208 to generate a second buffer (e.g., 236) referencing second data. The second data is output from the filter subroutine 208.

The filter processing module 140 generates 440 a second queue node including the completion handler 228. The filter processing module 140 executes 450 the second queue node. The executing includes processing the completion handler 228 to perform the completion tasks on buffer 212. For example, the completion tasks may include retrieving a completion code from the filter subroutine 208. Responsive to the completion code indicating that the filter subroutine 208 executed successfully, the first buffer 212 may be deleted to free up memory referenced by the first buffer 212.

The filter processing module 140 transmits 460 a response 124 to the client device 104 corresponding to the request 120. The response 124 may include the second data referenced by the second buffer 236.

Example Machine Providing Filter-Based Request Processing

Figure 5:
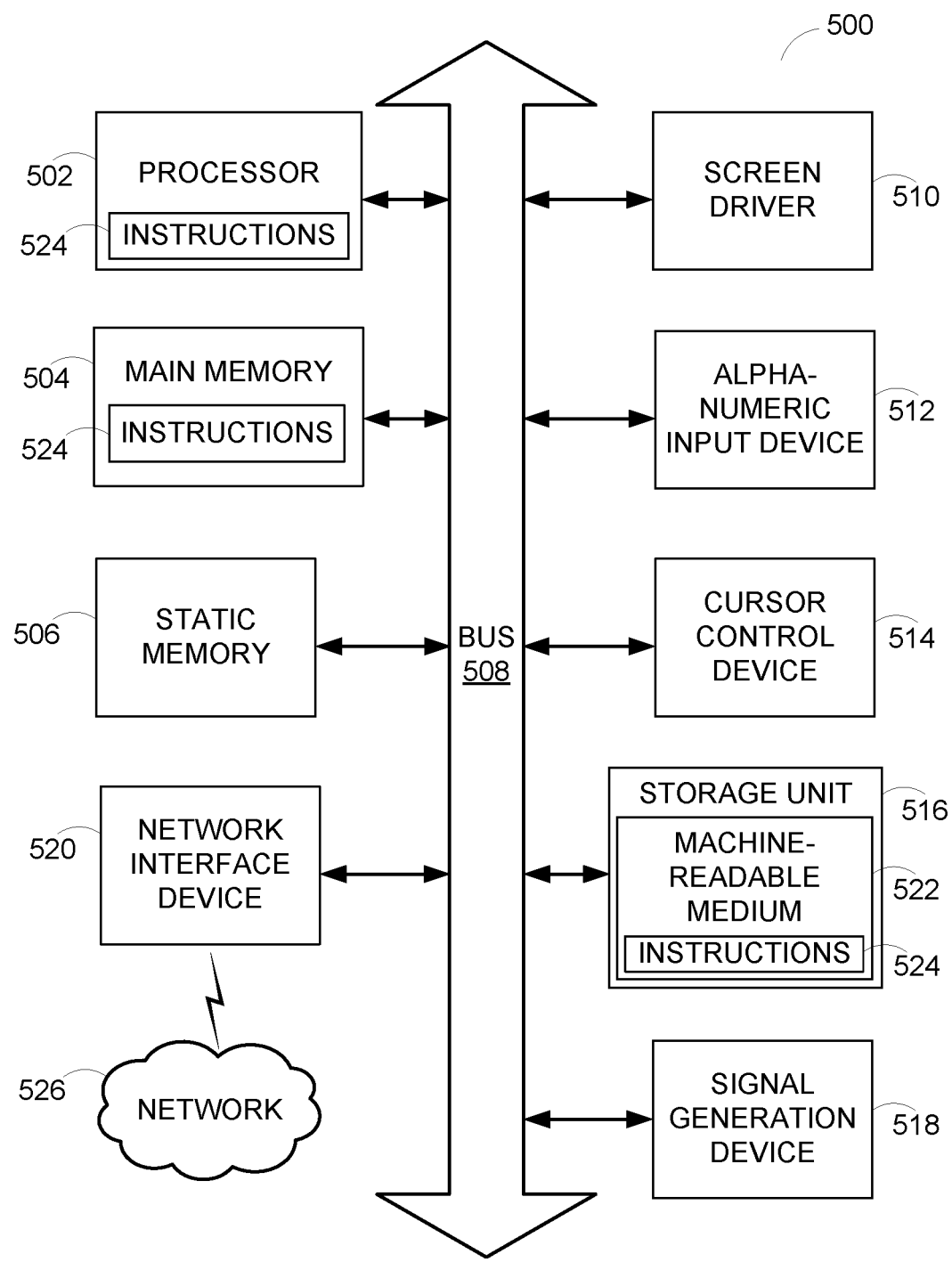
FIG. 5 illustrates components of an example machine able to read instructions for filter-based request processing, according to one embodiment.

FIG. 5 illustrates components of an example machine 500 able to read instructions for filter-based request processing, according to one embodiment. Those of skill in the art will recognize that other embodiments of the machine 500 can have different and/or other modules than the ones described here, and that the functionalities can be distributed among the modules in a different manner.

Specifically, FIG. 5 shows a diagrammatic representation of a machine in the example form of a computer system 500. The computer system 500 can be used to execute instructions 524 (e.g., program code modules) that cause the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a cloud server residing on a shared "virtualized" environment managed by a cloud hosting provider, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., program code modules) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any non-transitory medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for filter-based request processing, comprising:
    generating a first queue node referencing a filter subroutine for processing first data corresponding to a request;
    generating a first buffer referencing the first data and a completion handler for performing completion task associated with the referenced filter subroutine;
    executing the generated first queue node, wherein the executing further comprises:
        generating a second buffer; and
        processing the first data using the referenced filter subroutine to generate second data referenced by the generated second buffer;
        generating a second queue node referencing the completion handler, wherein the generating the second queue node further comprises retrieving a retention count from the generated first buffer, and wherein the generating the second queue node referencing the completion handler is responsive to the retrieved retention count indicating that no other referenced filter subroutine is using the first buffer;
        executing the generated second queue node, the executing comprising processing the completion handler to perform the completion tasks; and
        transmitting a response corresponding to the request upon performing the completion tasks.

2. The method of claim 1, wherein the processing of the completion handler comprises:
    retrieving a completion code from the referenced filter subroutine; and
    responsive to retrieving the completion code indicating that the referenced filter subroutine executed successfully, deleting the generated first buffer to free up memory referenced by the generated first buffer.

3. The method of claim 1, wherein the processing of the completion handler comprises:
    retrieving a completion code from the referenced filter subroutine; and
    responsive to retrieving the completion code indicating that the referenced filter subroutine executed successfully, adding the generated first buffer to a list of available buffers.

4. The method of claim 1, wherein the processing of the completion handler comprises:
    retrieving a completion code from the referenced filter subroutine; and
    responsive to retrieving the completion code indicating that the referenced filter subroutine exceeded memory referenced by the generated second buffer:
        determining that a third buffer is available;
        generating a third queue node referencing the filter subroutine; and
        executing the third queue node, the executing comprising restarting the referenced filter subroutine to generate third data referenced by the third buffer.

5. The method of claim 1, wherein the processing of the completion handler comprises:
    retrieving a completion code from the referenced filter subroutine; and
    responsive to retrieving the completion code, indicating that the referenced filter subroutine exceeded a maximum limit on a number of buffers corresponding to the request:
        determining that a third buffer is available; and
        restarting the referenced filter subroutine to generate third data referenced by the third buffer.

6. The method of claim 1, wherein the referenced filter subroutine is a first filter subroutine, the processing of the completion handler comprising:
    determining that a second filter subroutine exceeded memory referenced by a third buffer referencing third data, the second filter subroutine configured to generate the third data; and
    restarting the second filter subroutine to write the third data to the first buffer.

7. A non-transitory computer-readable storage medium storing computer-executable program instructions for filter-based request processing, the computer program instructions comprising instructions for:
    generating a first queue node for processing the first data corresponding to a request and referencing a first buffer and a filter subroutine, the first buffer referencing the first data and a completion handler for performing completion task associated with the referenced filter subroutine;
    executing the generated first queue node, the executing comprising processing the first data using the referenced filter subroutine to generate a second buffer referencing second data;
    generating a second queue node comprising the completion handler, wherein the generating the second queue node further comprises retrieving a retention count from the generated first buffer, and wherein the generating the second queue node referencing the completion handler is responsive to the retrieved retention count indicating that no other referenced filter subroutine is using the first buffer;

executing the generated second queue node, the executing comprising processing the completion handler to perform the completion task; and transmitting a response corresponding to the request and comprising the second data referenced by the second buffer upon performing the completion task.

8. The non-transitory computer-readable storage medium of claim 7, wherein the processing of the completion handler comprises:
   retrieving a completion code from the referenced filter subroutine; and
   responsive to retrieving the completion code indicating that the referenced filter subroutine executed successfully, deleting the generated first buffer to free up memory referenced by the generated first buffer.

9. The non-transitory computer-readable storage medium of claim 7, wherein the processing of the completion handler comprises:
   retrieving a completion code from the referenced filter subroutine; and
   responsive to retrieving the completion code indicating that the referenced filter subroutine executed successfully, adding the generated first buffer to a list of available buffers.

10. The non-transitory computer-readable storage medium of claim 7, wherein the processing of the completion handler comprises:
    retrieving a completion code from the referenced filter subroutine; and
    responsive to retrieving the completion code indicating that the referenced filter subroutine exceeded memory referenced by the generated second buffer:
    determining that a third buffer is available;
    generating a third queue node referencing the filter subroutine; and
    executing the third queue node, the executing comprising restarting the referenced filter subroutine to generate third data referenced by the third buffer.

11. The non-transitory computer-readable storage medium of claim 10, wherein the processing of the completion handler further comprises:
    restarting the referenced filter subroutine to write the second data to the third buffer.

12. The non-transitory computer-readable storage medium of claim 7, wherein the processing of the completion handler comprises:
    retrieving a completion code from the referenced filter subroutine; and
    responsive to retrieving the completion code, indicating that the referenced filter subroutine exceeded a maximum limit on a number of buffers corresponding to the request:
    determining that a third buffer is available; and
    restarting the referenced filter subroutine to generate third data referenced by the third buffer.

13. The non-transitory computer-readable storage medium of claim 7, wherein the referenced filter subroutine is a first filter subroutine, the processing of the completion handler comprising:
    determining that a second filter subroutine exceeded memory referenced by a third buffer referencing third data, the second filter subroutine configured to generate the third data; and
    restarting the second filter subroutine to write the third data to the first buffer.

14. A computer system comprising:
    a computer processor; and
    a non-transitory computer-readable storage medium storing computer-executable program instructions that when executed by the computer processor perform actions comprising:
    generating a first queue node for processing the first data corresponding to a request and referencing a first buffer and a filter subroutine, the first buffer referencing the first data and a completion handler for performing completion task associated with the referenced filter subroutine;
    executing the generated first queue node, the executing comprising processing the first data using the referenced filter subroutine to generate a second buffer referencing second data;
    generating a second queue node comprising the completion handler, wherein the generating the second queue node further comprises retrieving a retention count from the generated first buffer, and wherein the generating the second queue node referencing the completion handler is responsive to the retrieved retention count indicating that no other referenced filter subroutine is using the first buffer;
    executing the generated second queue node, the executing comprising processing the completion handler to perform the completion task; and
    transmitting a response corresponding to the request and comprising the second data referenced by the second buffer upon performing the completion task.

15. The computer system of claim 14, wherein the processing of the completion handler comprises:
    retrieving a completion code from the referenced filter subroutine; and
    responsive to retrieving the completion code indicating that the referenced filter subroutine executed successfully, deleting the generated first buffer to free up memory referenced by the generated first buffer.

16. The computer system of claim 14, wherein the processing of the completion handler comprises:
    retrieving a completion code from the referenced filter subroutine; and
    responsive to retrieving the completion code indicating that the referenced filter subroutine executed successfully, adding the generated first buffer to a list of available buffers.

17. The computer system of claim 14, wherein the processing of the completion handler comprises:
    retrieving a completion code from the referenced filter subroutine; and
    responsive to retrieving the completion code indicating that the referenced filter subroutine exceeded memory referenced by the generated second buffer:
    determining that a third buffer is available for storing the second data;
    configuring the first queue node to reference the third buffer; and
    configuring the third buffer to reference the second data.

18. The computer system of claim 17, wherein the processing of the completion handler further comprises:
    restarting the referenced filter subroutine to write the second data to the third buffer.

19. The computer system of claim 14, wherein the processing of the completion handler comprises:
    retrieving a completion code from the referenced filter subroutine; and responsive to retrieving the completion code, indicating that the filter subroutine exceeded a maximum limit on a number of buffers corresponding to the request:
  determining that a third buffer is available for storing the second data; and
  restarting the referenced filter subroutine to write the second data to the third buffer.

* * * * *